United States Patent [19]

Fritz et al.

[11] Patent Number: 5,192,628
[45] Date of Patent: Mar. 9, 1993

[54] ALKALINE ELECTROLYTE FOR GALVANIC ELEMENTS

[75] Inventors: Heinz P. Fritz, Garching; Heinz Frassdorf, Landshut, both of Fed. Rep. of Germany

[73] Assignee: Varta Batterie Aktiengesellschaft, Hanover, Fed. Rep. of Germany

[21] Appl. No.: 779,058

[22] Filed: Oct. 18, 1991

[30] Foreign Application Priority Data

Oct. 18, 1990 [DE] Fed. Rep. of Germany ....... 4033102

[51] Int. Cl.$^5$ .............................................. H01M 6/14
[52] U.S. Cl. .................................. 429/190; 429/206; 429/207
[58] Field of Search ................... 429/190, 206, 207; 252/62.2

[56] References Cited

U.S. PATENT DOCUMENTS 2,994,625 8/1961 Mendelsohn et al. ............... 429/207
3,578,504 5/1977 Hamlen et al. ................. 429/190 X
4,152,224 5/1979 Klein et al. ..................... 429/206 X
5,026,617 6/1991 Kosaka et al. ....................... 429/206

Primary Examiner—Stephen J. Kalafut
Attorney, Agent, or Firm—Weiser & Associates

[57] ABSTRACT

Surface rich forms of magnesium hydroxide and/or basic magnesium salts, or titanium (IV) oxide, preferably with lye or an aqueous potassium carbonate solution in weight ratios of between about 1:0.5 and 1:2, or between about 1:1.5 and 1:4.5, respectively, produce pastes of a consistency ranging from nearly dry to wet. These pastes are used in producing alkaline primary and secondary elements with immobilized electrolytes and high operating capacities. The specific surfaces of the solids are preferably in the range of from 25 to 50 m$^2$/g (and higher). The paste electrlytes can be utilized in the temperature range of from $-50°$ C. to near the boiling point of the pure electrolyte, while exhibiting capacities which scarcely differ from those of an additive-free KOH electrolyte.

10 Claims, 1 Drawing Sheet

ALKALINE ELECTROLYTE FOR GALVANIC ELEMENTS

BACKGROUND OF THE INVENTION

The present invention relates to an alkaline electrolyte for galvanic elements, which electrolyte additionally contains materials with gelling or adsorption capabilities.

The field of application of the present invention primarily extends to alkaline primary and secondary elements, since their operational reliability makes fixation of the electrolyte desirable. However, the present invention is not limited to specific battery systems of the alkaline type, but may also encompass other systems, such as fuel cells.

Ordinarily, such elements operate with an alkaline electrolyte based on the $KOH/H_2O$ system. However, in $H_2$/air fuel cells, or metal/air elements, there is an unavoidable introduction of $CO_2$ from ambient air which rapidly creates a $KOH/K_2CO_3/KHCO_3/H_2O$ electrolyte system. Consequently, in alkaline systems, precautions must normally be taken to exclude air ($CO_2$).

Acidic electrolytes such as $H_2SO_4/H_2O$ can be immobilized by means of gellable materials such as $SiO_2$, as well as by $Al_2O_3$, $TiO_2$ or zeolites. However, these inorganic substances cannot be used to fixate alkaline electrolytes because such substances exhibit both basic and acidic properties, making it impossible to preclude them from dissolving in the alkaline medium. For example, in the case of $TiO_2$, the literature sometimes speaks in favor of (cf. Gmelins Handbook of Inorganic Chemistry (8th Edition), Verlag Chemie, Weinheim, Germany 1951, Chapter 41, page 255) and sometimes against (cf. Cotton-Wilkinson, Inorganic Chemistry, Weinheim, Germany 1985, page 709) stability in aqueous alkaline hydroxides.

As long as the system is not limited to a quantity of potassium or sodium hydroxide solution which is just sufficient for operation of the storage battery, and which can be fixated through capillary action only within the pore structure of the electrodes and the separator, fixation of the electrolyte in alkaline cells has always been achieved by means of gellable organic substances. Practical examples are carboxymethyl cellulose, potato starch, alginates, lignin, soluble resins and polyvinyl alcohol derivatives or compounds which yield a polyvinyl alcohol through hydrolysis or saponification.

When using such thickening agents, the danger arises that during periods of disuse or in the course of discharging of the cell, the liquid electrolyte will separate from the gel. Large quantities of gelating medium can sometimes stop this process. However, according to U.S. Pat. No. 4,332,870, this is also the cause of a reduction in the ion conductivity of the electrolyte, i.e., an increase in its ion resistance. As a remedy, it is proposed to simultaneously add a multivalent alcohol (through which, homogenizing of the electrolyte is to be achieved) to the gelating medium, in this case a starch product with a hydrophilic side chain. In so doing, the highly water soluble alcohol functions as a binder between the powdery anode metal (e.g., zinc) and the gelating medium, and to gel the latter by absorption of water, in situ, so that the metal particles are uniformly distributed in the gel which is formed.

German Patent Publication (DE-OS) 2,736,578 teaches that by drying a coprecipitate of $Co(OH)_2$, $Cd(OH)_2$ and $Mg(OH)_2$, a gellable powder is yielded which can be used as an additive and which can be utilized in the electrolyte of an alkaline zinc secondary cell as a source of cobalt and cadmium ions. The purpose is to cause the coprecipitation of these metals to interface with the deposition of zinc at preferred growth loci of its crystal lattice, and thereby prevent dendrite growth. In so doing, the magnesium hydroxide performs only the function of a carrier or an extender.

SUMMARY OF THE INVENTION

The present invention has as its primary object to provide means for immobilizing alkaline electrolytes, which is desirable because of the high energy and current density of alkaline batteries.

This, and other objects which will appear are achieved in accordance with the present invention by providing an alkaline electrolyte for galvanic elements, which electrolyte contains substances with a gelling or adsorption capacity and which is immobilized by the addition of magnesium hydroxide, basic magnesium salts or titanium (IV) oxide with a high specific surface.

For further details, reference is made to the discussion which is provided below, in light of the accompanying drawings.

DETAILED DESCRIPTION OF THE PREFERRED EMBODIMENTS

Figure 1:
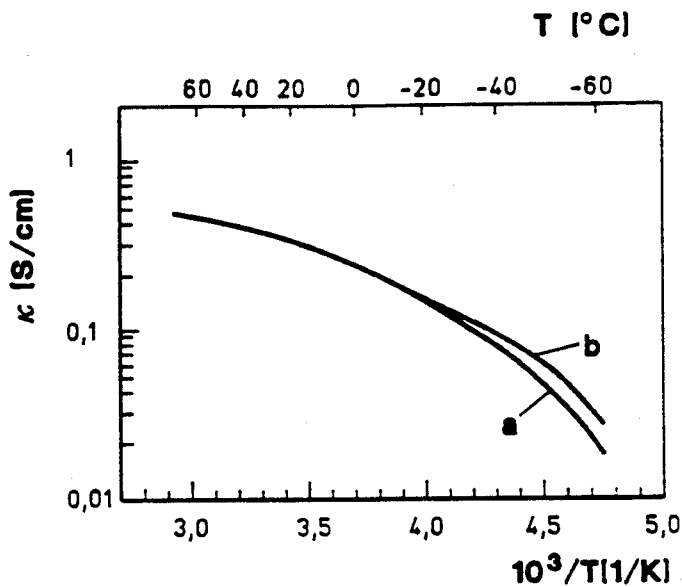
FIG. 1 is a graph which compares variations, with temperature, of the specific conductivity of a pure KOH electrolyte with that of an electrolyte fixated with $TiO_2$.

Particularly suitable for the fixation of aqueous alkaline electrolytes through the formation of mixtures ranging from solid to paste-like consistency is the surface-rich magnesium hydroxide (brucite), or basic magnesium salts such as basic magnesium carbonate (magnesia alba), which are also difficult to dissolve in a strongly alkaline medium. Surprisingly, in addition to magnesium hydroxide, and the basic magnesium salts, surface-rich titanium (IV) oxide (anatase) has also proven to be a suitable electrolyte carrier, which remains stable under the operating conditions of alkaline cells.

In accordance with the present invention, the specific surface of the magnesium hydroxide should be between about 10 and 50 $m^2/g$, and preferably about 25 $m^2/g$. For titanium (IV) oxide, the specific surface should exceed this range, and can be as high as 200 $m^2/g$. However, a specific surface of about 50 $m^2/g$ is generally quite suitable.

This is demonstrated by experiments described below, in which two $Mg(OH)_2$ products (A and B) of different origins, as well as two $TiO_2$ products (C and D) of different origins, were utilized:

(A) Product designation "BPC 73"; Source—Dr. P. Lohmann GmbH KG, of 3254 Emmerthal, Germany; Purity >95%; Specific surface—25 $m^2/g$.

(B) Product No. 63081; Source—Fluka AG, of CH-9470 Budes, Switzerland; Purity >98%; Specific surface—15 m²/g.

(C) Product designation "P 25"; Source—Degussa, of 6000 Frankfurt/Main, Germany; Chemically pure; Specific surface—50 m²/g.

(D) Product No. 89490; Source—Fluka AG, of CH-9470 Budes, Switzerland; Purity >99%; Specific surface—8.5 m²/g.

To produce an immobilized electrolyte in accordance with the present invention, the following was mixed in each case: 1 g of one of the products A, B, C or D with a volume of between 0.5 and 4.5 ml of aqueous (30% by weight) lye or potassium carbonate solution. The resulting specimens, of a consistency ranging from dry to a wet-paste depending upon the mixture proportions, were "ripened" for 1 day, then stirred, and thereafter subjected to electrical resistance measurements. In so doing, over a temperature range of from −70° to +70° C., the impedance was measured over a frequency range of from 0.1 to $10^5$ Hz and the pure resistance was measured over a frequency range of from $10^3$ to $10^5$ Hz.

Table 1 below provides an overview of seven exemplary embodiments.

TABLE 1

| Specimen | Product | Specific Surface (m²/g) | ml 30% by weight solution/g of product | | $\kappa_{RT}$ (S/cm) | Consistency |
|---|---|---|---|---|---|---|
| | | | KOH | $K_2CO_3$ | | |
| 1 | B | 15 | 1.5 | — | 0.243 | wet |
| 2 | A | 25 | 1.5 | — | 0.251 | very moist |
| 3 | A | 25 | 2.0 | — | 0.297 | wet |
| 4 | D | 8.5 | 1.5 | — | 0.184 | very wet |
| 5 | C | 50 | 1.5 | — | 0.302 | clumpy, solid |
| 6 | C | 50 | 4.0 | — | 0.366 | very wet |
| 7 | C | 50 | — | 4.0 | 0.177 | very wet |

As can be seen, an increase in specific surface of the carrier has a positive effect on the specimen in the sense of an enhancement in its specific conductivity ($\kappa$). This is because the specimen carries with it an increased capacity for accepting electrolytes, which clearly manifests itself in the varying consistency of the specimens.

This is shown most clearly by a comparison of specimens 4, 5 and 6. The highly surface-rich $TiO_2$ product (C), with a specific surface six times greater than that of the $TiO_2$ product (D), remained essentially dry when taking up the same quantity of electrolyte (1.5 ml), whereas its specific conductivity ($\kappa$) increased by more than 1.5 times. Due to its greater specific surface, the product (C) was capable of binding 4 ml of electrolyte before reaching the same, very wet consistency reached by the product (C) with only 1.5 ml of electrolyte. At the same time, the conductivity rose to twice the value of Specimen 4.

As Table 1 shows, the electrolyte volume plays only a subordinate role.

In addition to this quantitative background, it has further been found that for the $KOH/H_2O$ electrolyte system, the paste electrolyte is stable with temperature and can be utilized from −50° C. up to nearly the boiling point of the pure electrolyte.

In order to enable direct comparison with the measured characteristics using solid additives, measurements were obtained of the specific conductivity ($\kappa$) for a pure KOH electrolyte over a wide range of temperatures. These are contrasted in FIG. 1, by way of example, with those of an electrolyte fixated with $TiO_2$. In FIG. 1, Curve (a) shows the measured values for pure 30% by weight $KOH/H_2O$, and Curve (b) shows the measured values for a paste electrolyte (4.0 ml of 30% by weight $KOH/H_2O$ per gram of $TiO_2$ product (C)).

From these investigations, it was found that the addition of brucite as a matrix had only a slight negative effect and at low temperatures even a slight positive effect (as can be seen from FIG. 1, this is also the case for $TiO_2$) upon the conductivity of the alkaline electrolyte (cf. S. U. Falk, A. J. Salkind, "Alkaline Storage Batteries", J. Wiley & Sons, New York 1969, page 593, and R. Jasinski, "High-Energy Batteries", Plenum Press, New York 1967, page 50). However, overall, the specific conductivities of the free electrolyte and the paste electrolyte are close to each other. For example, it was found that $\kappa_{RT}=0.374$ S/cm for 30% by weight of $KOH/H_2O$, while $\kappa_{RT}=0.366$ S/cm for the paste electrolyte (4.0 ml of 30% by weight of $KOH/H_2O$ per gram of $TiO_2$ product (C)). From the statement in the above-mentioned monograph of Falk and Salkind (see also, E. M. Zhurenkov et al, Zh. Prikl. Khim. Leningrad, U.S.S.R 1975, 48(4), 789) that the transference number $t(OH^-)$ is significantly greater than 0.7, it can be concluded that hydroxide ions predominantly constitute the charge transporting, mobile species.

Paste electrolytes which were measured several times at varying intervals within 90 days exhibited no change. From this it can be concluded that a very brief "ripening period" suffices for the complete adsorption of the electrolyte through capillary action (cf. F. M. Delnick et al., J. Electrochem. Soc. 137 (11) (1990)). Moreover, the immobilized electrolyte remains stable over an extended storage period.

The formation of titanate which is occasionally postulated in the literature (see, for example, Cotton-Wilkinson, Inorganic Chemistry (4th Edition), Verlag Chemie, Weinheim, Germany 1985, pages 709 et seq.) can also be ruled out by virtue of the absence of the characteristic TiO lines in the respective, simultaneously observed Raman spectra.

Table 2 shows that the specific conductivity increases with increasing electrolyte volume, i.e., in going from a pourable, to a paste-like, and then to a fluid product. When using $Mg(OH)_2$, a quadrupling of the electrolyte content causes an increase in specific conductivity by a factor of about three.

TABLE 2

| ml 30% by weight $KOH/H_2O$ per gram of $Mg(OH)_2$ (product A) | Specimen Consistency | $\kappa_{RT}$(S/cm) (extrapolated) |
|---|---|---|
| 0.5 | very clumpy | 0.114 |
| 0.6 | clumpy | 0.135 |
| 0.9 | very viscous-moist | 0.157 |
| 1.0 | viscous-moist | 0.191 |
| 1.1 | moist | 0.210 |
| 1.2 | moist | 0.242 |
| 1.3 | moist | 0.209 |
| 1.4 | very moist | 0.203 |
| 1.5 | very moist | 0.251 |
| 2.0 | wet | 0.297 |

Table 3 provides a similar overview for a series of experiments with $TiO_2$ as the electrolyte carrier.

TABLE 3

| ml 30% by weight $KOH/H_2O$ per gram of $TiO_2$ (product C) | Specimen Consistency | $\kappa_{RT}$(S/cm) (extrapolated) |
|---|---|---|
| 1.50 | very clumpy | 0.302 |

TABLE 3-continued

| ml 30% by weight KOH/H$_2$O per gram of TiO$_2$ (product C) | Specimen Consistency | $\kappa_{RT}$(S/cm) (extrapolated) |
|---|---|---|
| 1.75 | clumpy | 0.325 |
| 2.00 | very viscous | 0.358 |
| 2.25 | viscous | 0.348 |
| 2.50 | moist | 0.341 |
| 2.75 | moist | 0.351 |
| 3.00 | very moist | 0.361 |
| 3.25 | very moist | 0.381 |
| 3.50 | wet | 0.371 |
| 4.00 | very wet | 0.366 |
| 4.50 | liquid | 0.377 |

Here, a tripling of the electrolyte content causes an increase in specific conductivity by only a factor of 1.25. Thus, as noted earlier for Table 1, for product (C) the effect of the electrolyte volume is less pronounced, due to its greater surface, than for product (A).

Regarding the dependence of the specific conductivity ($\kappa$) upon the electrolyte concentration, the same optimum applies as for the pure electrolyte (i.e., for the paste electrolytes one should also strive for 30% by weight KOH). Regarding the consistency of the specimens, it is noted that it has not yet been possible to attribute numerical values to the degree of fixation. Rather, the variation from "clumping together" to "distinctly wet" can only be described qualitatively.

Figure 2:
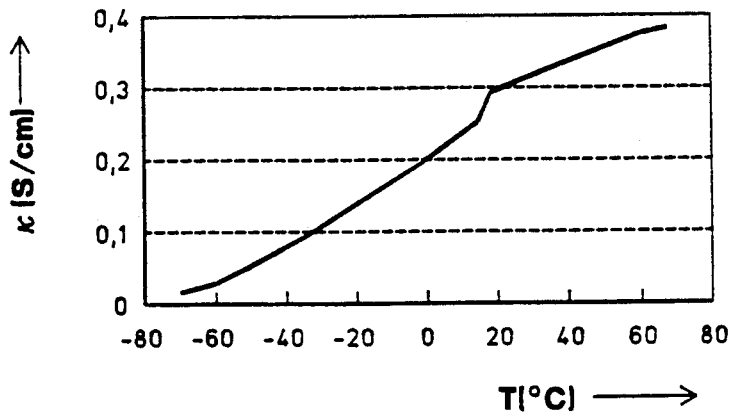
FIG. 2 is a graph which shows the relationship between temperature and specific conductivity for a particular paste electrolyte.

FIG. 2 shows variation of the specific conductivity $\kappa$(S/cm) with temperature T(° C.) for the paste electrolyte (2.0 ml of 30% by weight KOH/H$_2$O per gram of Mg(OH)$_2$ product (A)). Thus, immobilizing the KOH/H$_2$O electrolyte system yields a specific conductivity on the order of magnitude of $\kappa > 10^{-1}$ S/cm at RT for solid or "moist-clumping" consistency. For the KOH/K$_2$CO$_3$/KHCO$_3$/H$_2$O alkaline electrolyte system obtained by CO$_2$ absorption from aqueous lye, comparable results were obtained though an immobilization with brucite.

Figure 3:
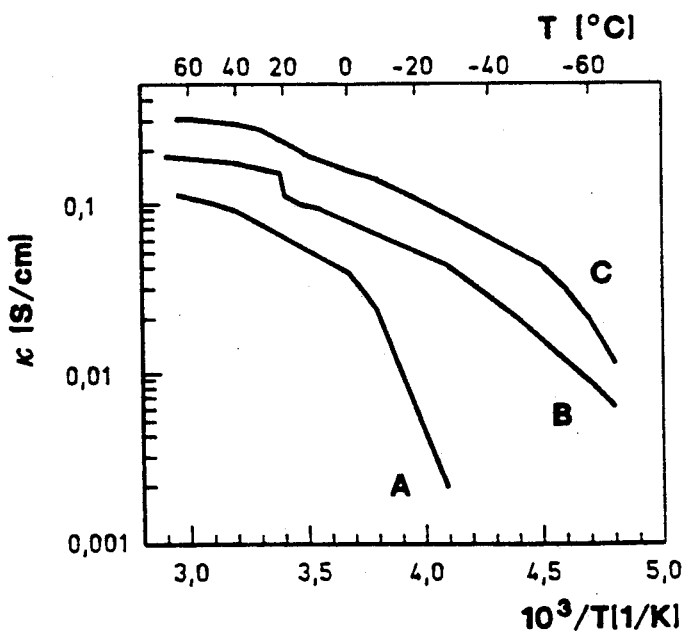
FIG. 3 is a graph which compares variations, with temperature, of the specific conductivity of certain electrolyte systems with that of a $KOH/H_2O$ system.

FIG. 3 shows the temperature dependence of the specific conductivity for a particular system compared to that for the KOH/H$_2$O electrolyte system. Shown in the figure are the following:

Curve A: 1.0 ml of 30% by weight K$_2$CO$_3$/H$_2$O per gram of Mg(OH)$_2$ (product B) when wet.
Curve B: 1.0 ml of 30% by weight KOH/H$_2$O per gram of Mg(OH)$_2$ (product B) when moist.
Curve C: 1.5 ml of 30% by weight KOH/H$_2$O per gram of Mg(OH)$_2$ (product B) when wet.

However, from this figure it follows that in the examined temperature range, the KOH/H$_2$O paste electrolyte exhibits a higher specific conductivity than the electrolytes with potassium carbonate.

For 10%, 30%, and 50% by weight K$_2$CO$_3$/H$_2$O solutions, into which CO$_2$ was introduced, measurements of the pH value showed that the pH soon drops to a constant saturation value. This points to a dynamic balance between carbon dioxide absorption and desorption. For example, for a paste electrolyte produced by intensive gas infusion for three hours into a 30% by weight K$_2$CO$_3$/H$_2$O solution (initial pH=12.25; CO$_2$-saturated pH=10.50 at RT), with an addition of brucite (2 g of Mg(OH)$_2$ (product B)/2.0 ml of electrolyte), a specific conductivity is observed which decreases only by a factor of ⅔.

This is very desirable, especially for use in alkaline fuel cells or, for example, in zinc/air batteries, because the otherwise detrimental take-up of CO$_2$ from air (in alkaline electrolytes) and the solidification of liquid electrolytes is of no importance. However, the fundamental advantage of the present invention resides in that nickel/cadmium and, if desired, also nickel/iron storage batteries, can now be produced in their chemical and newer variants, as well as alkaline fuel cells with fixated electrolytes. Moreover, one can even expect high performance values from such systems due to exhibited specific conductivities on an order of magnitude of $\kappa > 10^{-1}$ S/cm, which have been found to apply to such immobilized electrolytes. The electrolytes of the present invention are also easy to produce, and are easy to process because they can be metered by volume. They are especially suitable for the miniaturization of cells, because they can be employed in thin layers without additional separation. They have a certain degree of mechanical strength, which inhibits possible dendrite growth, and yet permit a compensation for volume changes without losing contact with the anode and cathode, in contrast to rigid solid ion conductors (Li$_3$N, Li$_4$SiO$_4$).

It will therefore be understood that various changes in the details, materials and arrangement of parts which have been herein described and illustrated in order to explain the nature of this invention may be made by those skilled in the art within the principle and scope of the invention as expressed in the following claims.

What is claimed is:

1. An alkaline electrolyte for galvanic elements, wherein the electrolyte contains substances with a gelling or adsorption capability, and wherein the electrolyte is immobilized by an addition selected from the group consisting of magnesium hydroxide and basic magnesium salts combined with lye or an aqueous potassium carbonate solution in a proportion by weight of from about 1:0.5 to about 1:2.

2. The alkaline electrolyte of claim 1 wherein the electrolyte is immobilized by magnesium hydroxide having a specific surface of from about 10 to about 50 m$^2$/g.

3. The alkaline electrolyte of claim 2 wherein the specific surface is about 25 m$^2$/g.

4. The alkaline electrolyte of claim 1 wherein the electrolyte is immobilized by magnesium hydroxide and a basic magnesium salt.

5. The alkaline electrolyte of claim 1 wherein the electrolyte is immobilized by a basic magnesium salt.

6. The alkaline electrolyte of claim 5 wherein the basic magnesium salt is a basic magnesium carbonate.

7. An alkaline electrolyte for galvanic elements, wherein the electrolyte contains substances with a gelling or adsorption capability, and wherein the electrolyte is immobilized by an addition of titanium (IV) oxide with a specific surface of about 50 m$^2$/g.

8. An alkaline electrolyte for galvanic elements, wherein the electrolyte contains substances with a gelling or adsorption capability, and wherein the electrolyte is immobilized by an addition of titanium (IV) oxide mixed with lye or an aqueous potassium carbonate solution in a proportion by weight of from about 1:1.5 to about 1:4.5.

9. The alkaline electrolyte of claim 8 wherein the specific surface of the titanium (IV) oxide has a value from about 10 to about 200 m$^2$/g.

10. The alkaline electrolyte of claim 9 wherein the specific surface is about 50 m$^2$/g.

* * * * *